US009027347B2

(12) United States Patent
Gruss et al.

(10) Patent No.: US 9,027,347 B2

(45) Date of Patent: May 12, 2015

(54) SOLAR COLLECTOR, AND AN ELECTRICAL ENERGY GENERATION PLANT INCLUDING SUCH SOLAR COLLECTORS

(75) Inventors: Jean-Antoine Gruss, Seyssinet (FR); Christian Lenôtre, Bar-sur-Loup (FR); Alain Marechal, Tullins (FR); Didier Rossi, Toulon (FR); Michel Wohrer, Neuilly sur Seine (FR)

(73) Assignees: Sophia Antipolis Energie Developpement, Valbonne (FR); Commissariat a l'Energie Atomique et aux Energies Alternatives, Paris (FR)

( * ) Notice: Subject to any disclaimer, the term of this patent is extended or adjusted under 35 U.S.C. 154(b) by 147 days.

(21) Appl. No.: 13/138,404

(22) PCT Filed: Feb. 8, 2010

(86) PCT No.: PCT/FR2010/050196

§ 371 (c)(1), (2), (4) Date: Feb. 9, 2012

(87) PCT Pub. No.: WO2010/092283

PCT Pub. Date: Aug. 19, 2010

(65) Prior Publication Data

US 2012/0124999 A1 May 24, 2012

(30) Foreign Application Priority Data

Feb. 12, 2009 (FR) ..................................... 09 50884

(51) Int. Cl.

| | |
|---|---|
| ***B60K 16/00*** | (2006.01) |
| ***B60L 8/00*** | (2006.01) |
| ***F03G 6/00*** | (2006.01) |
| ***F28D 15/00*** | (2006.01) |

(Continued)

(52) U.S. Cl.

CPC .. *F24J 2/32* (2013.01); *F24J 2/055* (2013.01); *Y02E 10/44* (2013.01); *Y02E 10/46* (2013.01)

(58) Field of Classification Search

USPC ....................... 60/641.8; 165/104.21–104.26; 23/641.8; 126/433, 443, 438, 569–713

See application file for complete search history.

(56) References Cited

U.S. PATENT DOCUMENTS

| | | | | |
|---|---|---|---|---|
| 4,122,831 | A | 10/1978 | Mahdjuri | 126/271 |
| 4,217,882 | A * | 8/1980 | Feldman, Jr. | 126/636 |
| 4,257,402 | A * | 3/1981 | Westerman, II | 126/652 |

(Continued)

FOREIGN PATENT DOCUMENTS

| | | | |
|---|---|---|---|
| DE | 197 14 774 | A1 | 10/1998 |
| DE | 19714774 | A1 | 10/1998 |

(Continued)

*Primary Examiner* — Kenneth Bomberg

*Assistant Examiner* — Daniel Wagnitz

(74) *Attorney, Agent, or Firm* — Davidson, Davidson & Kappel, LLC

(57) ABSTRACT

A solar collector (26) includes: an outer tube (64) of circular cross-section, closed at one of its ends, an absorption layer (52) arranged inside the outer tube (64), for absorbing solar radiation (Rs), and a heat pipe (56) including a hot part (58) laid out inside the outer tube (64), a cold part (60) arranged outside the outer tube (64), and a reservoir (62) containing a heat pipe fluid (63) and extending over the hot part (58) and the cold part (60). The outer tube (64) is hermetically closed around the heat pipe (56) at the other of its ends, a vacuum being formed inside said outer tube (64). For the hot part (58) of the heat pipe (56), the reservoir (62) is applied at least locally against the absorption layer (52).

16 Claims, 7 Drawing Sheets

(51) Int. Cl.
*F24J 2/32* (2006.01)
*F24J 2/05* (2006.01)

(56) References Cited

U.S. PATENT DOCUMENTS

| | | | | |
|---|---|---|---|---|
| 4,306,543 | A * | 12/1981 | Doevenspeck et al. | 126/638 |
| 4,313,423 | A * | 2/1982 | Mahdjuri | 126/637 |
| 4,335,709 | A * | 6/1982 | Slaats | 126/635 |
| 4,362,025 | A * | 12/1982 | Theakston | 62/148 |
| 4,416,261 | A * | 11/1983 | van der Aa | 126/635 |
| 6,047,697 | A * | 4/2000 | Best | 126/635 |
| 6,817,357 | B2 * | 11/2004 | Brunotte et al. | 126/655 |
| 2008/0209907 | A1 | 9/2008 | Xiao et al. | 60/641.15 |
| 2009/0211249 | A1 | 8/2009 | Wohrer et al. | |
| 2012/0222839 | A1 * | 9/2012 | Huang | 165/104.26 |

FOREIGN PATENT DOCUMENTS

| | | | |
|---|---|---|---|
| DE | 201 08 682 | | 10/2002 |
| EP | 0 054 319 | A | 6/1982 |
| EP | 0054319 | A1 | 6/1982 |
| EP | 1 203 915 | A | 5/2002 |
| EP | 1916486 | A2 | 4/2008 |
| EP | 2096305 | A1 | 9/2009 |
| JP | 5090235 | U | 7/1975 |
| JP | 5533596 | A | 3/1980 |
| JP | 5634057 | A | 4/1981 |
| JP | 572954 | A | 1/1982 |
| JP | 58210439 | A | 12/1983 |
| JP | 59183254 | A | 10/1984 |
| JP | 60105861 | A | 6/1985 |
| JP | 61168750 | A | 7/1986 |
| JP | 2003042572 | A | 2/2003 |
| NL | 8 201 773 | A | 11/1983 |

* cited by examiner 44
6
43
40
38
42
40
38
40
24
28
46
22
28
45
34
32
20
36
18
14
4
2
10
12
16
28
30
26
8

SOLAR COLLECTOR, AND AN ELECTRICAL ENERGY GENERATION PLANT INCLUDING SUCH SOLAR COLLECTORS

The present invention relates to a solar collector of the type comprising:

an outer tube of circular cross-section, closed at one of its ends, an absorption layer arranged inside the outer tube, for absorbing solar radiation, and a heat pipe including a hot part laid out inside the outer tube, a cold part arranged outside the outer tube, and a reservoir containing a heat pipe fluid and extending over the hot part and the cold part, said outer tube being hermetically closed around the heat pipe at the other of its ends, a vacuum being formed inside said outer tube.

The invention also relates to a system for producing hot water from solar energy comprising:

a plurality of solar collectors suitable for heating a heat transfer fluid from solar energy, and a circuit for transporting the heat transfer fluid between the solar collectors and a hot water distributor.

The invention also relates to a plant for generating electrical energy from solar energy comprising:

a hot water production system, a heat sink, and an electricity-producing thermodynamic machine, using the hot water produced by said system and the heat sink.

BACKGROUND

There is known a solar collector with a vacuum tube comprising an outer tube and an inner tube, the tubes being concentric and substantially cylindrical. Each tube is closed at one of its ends, and the tubes are sealed one to the other at the other of their ends. The solar collector comprises a solar radiation absorption layer arranged on an outer surface of the inner tube and oriented towards the outer tube. The solar collector includes a heat pipe having a hot part (evaporator) laid out inside the inner tube, a cold part (condenser) arranged outside the tubes, and a reservoir containing a heat pipe fluid, and extending over the hot part and the cold part. The hot part of the heat pipe comprises the reservoir in the shape of a cylinder substantially centered on the axis of the inner tube, and two fins fixed to the cylindrical reservoir, in a diametrically opposite manner, and mechanically and thermally linking the reservoir to the inner surface of the inner tube. The reservoir has a diameter that is much smaller than that of the inner tube.

Thermal conduction up to the absorption layer is not optimal, bringing about significant heat losses.

SUMMARY OF THE INVENTION

It is an object of the present invention to improve thermal conduction up to the heat pipe, in order to reduce heat losses.

The present invention provides a solar collector of the abovementioned type, wherein for the hot part of the heat pipe, the reservoir is applied at least locally against the absorption layer.

According to the Stefan-Boltzmann law, the energy flux emitted by a black body, also referred to as quantity of black body radiation, increases as the fourth power of T, where T represents the absolute temperature of the black body, expressed in Kelvin. As for the black body radiation which evades the greenhouse effect caused by the glass outer tube, this increases according to a power of T even higher than 4.

The solar collector according to the invention provides better thermal conduction between the absorption layer, considered to be a black body, and the heat pipe, thereby markedly reducing the rise in temperature of the absorption layer as compared with a conventional solar collector. Thus, the solar collector according to the invention, provides for reducing heat losses by black body radiation evading the greenhouse effect, thus improving the efficiency of the collector.

According to other embodiments, the solar collector comprises one or more of the following features, taken in isolation or in any technically possible combination:

the solar collector additionally comprises an inner tube of circular cross-section, arranged inside the outer tube, each tube being closed at one of its ends, and the tubes being sealed one to the other at the other of their ends, the tubes being separated by a vacuum;

the inner tube includes an outer surface oriented towards the outer tube, and an inner surface, the absorption layer is arranged against said outer surface, and, for the hot part of the heat pipe, the reservoir is applied at least locally against said inner surface;

the collector includes a thermally conductive interface, arranged between the absorption layer and the hot part of the heat pipe;

the hot part of the heat pipe is in the shape of a half-cylinder;

a cross-section of the hot part is in the shape of an arc of a circle of an angle of between 180° and 220°;

the cold part of the heat pipe is suitable for being arranged in contact with a cylindrical pipe, and the cold part is in the shape of at least one half-cylinder;

the axis of the half-cylinder of the hot part is different from the axis of the half-cylinder of the cold part, and the heat pipe includes a narrowing of its circumferential and/or longitudinal extent between the hot part and the cold part, with respect to its extent in the regular part of the hot and cold parts, the narrowing forming a connecting joint between the hot part and the cold part;

the reservoir includes at least three channels for circulating the heat pipe fluid, generally extending side by side;

the or each channel is oriented substantially according to the axis of the half-cylinder of the hot part;

the heat pipe is produced from aluminum;

the heat pipe is formed by two metal sheets merged with each other outside the area forming the reservoir, the reservoir being formed by an interstice between the two sheets;

the heat pipe exhibits a sheet structure with a warped surface, the sheet including a network of channels forming the reservoir, the channels being linked by a web portion.

Another aspect of the invention is a hot water production system of the abovementioned type, wherein the solar collectors are as defined above.

According to another embodiment, the hot water production system comprises the following feature:

the transport circuit comprises a transport pipe for the heat transfer fluid, and the system comprises, for each solar collector, a part for fastening the collector to the pipe, said fastening part being thermally conductive and arranged in contact with the pipe.

Another aspect of the invention is an electrical energy generation plant of the abovementioned type, wherein the hot water production system is as defined above.

BRIEF DESCRIPTION OF THE DRAWINGS

The invention and its advantages will become clearer from reading the following description given purely by way of example and with reference to the appended drawings in which:

In FIG. 1, a plant for generating electrical energy from solar energy includes a hot water production system 2, a heat sink 4 and an electricity-producing thermodynamic machine 6.

DETAILED DESCRIPTION

Figure 1:
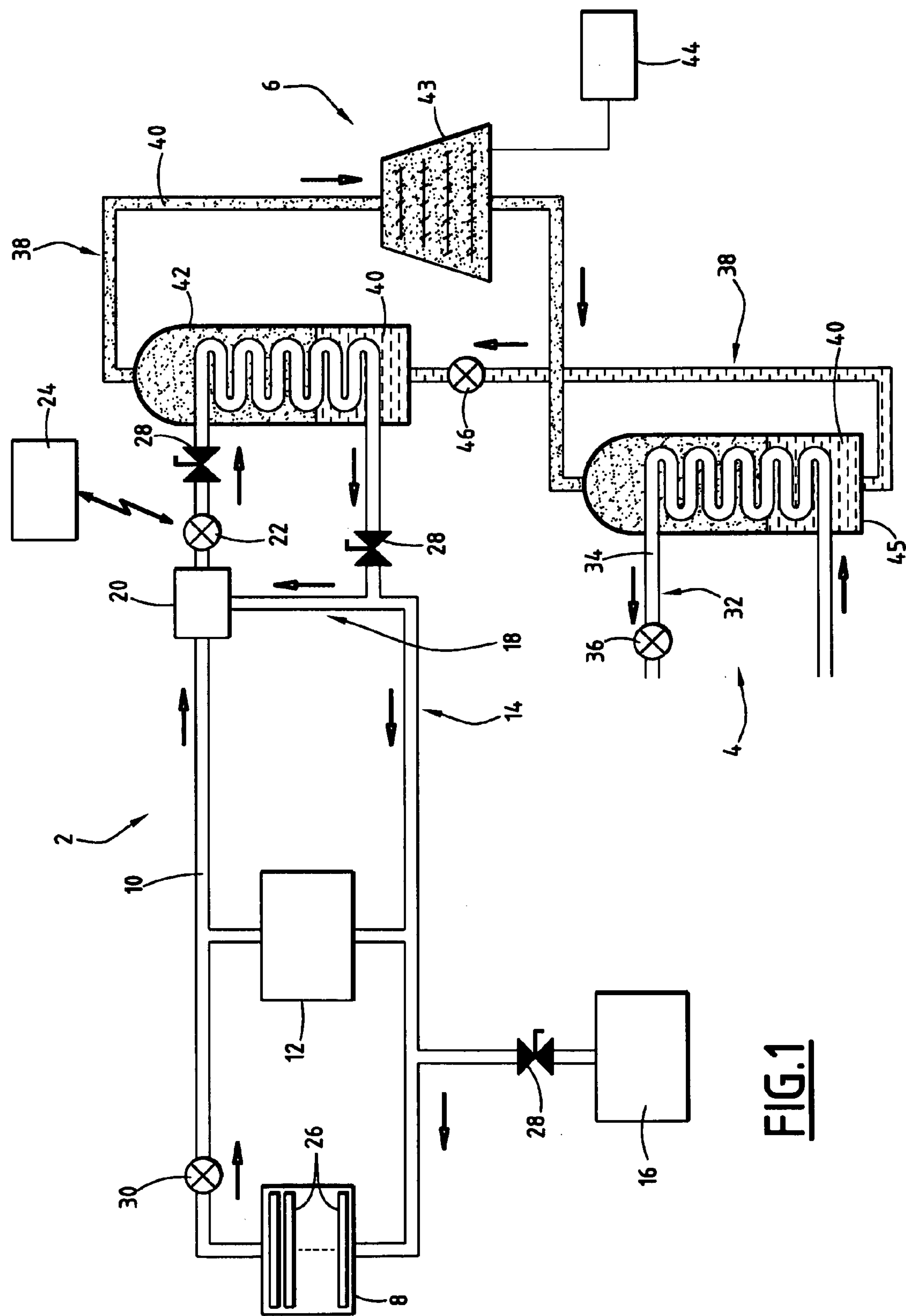
FIG. 1 is a schematic representation of an electrical energy generation plant according to the invention.

The hot water production system 2 comprises means 8 for heating, by solar energy, a first heat transfer fluid 10, means 12 for storing thermal energy and a first closed circuit 14 for transporting the first heat transfer fluid 10. The first circuit 14 links the heating means 8, the storage means 12 and the electricity-producing thermodynamic machine 6.

The hot water production system 2 comprises a storage tank 16 for relieving the first circuit 14 for transporting the first heat pipe fluid 10.

The hot water production system 2 comprises a feedback loop 18 including a mixer 20 and a first pump 22. The plant includes means 24 for remotely controlling the loop 18.

The heating means 8 include a plurality of solar collectors 26 described in more detail later with reference to FIGS. 2 to 7.

The first heat transfer fluid 10 is, for example, water used at a maximum temperature of 150° C. and under a maximum pressure of 6 bar.

The first circuit 14 includes a plurality of valves 28, the mixer 20, the first pump 22 and a second pump 30. The first fluid 10 is circulated in the first circuit 14 by the two pumps 22, 30.

The storage means 12 and the first circuit 14 are lagged by an insulator, not represented.

The heat sink 4 comprises a second circuit 32 for transporting a second heat transfer fluid 34. Circulation is provided by a pump 36. The second fluid 34 is, for example, water.

The thermodynamic machine 6 comprises a third circuit 38 for transporting a working fluid 40, a boiler 42, a turbine 43 coupled to an electricity generator 44 and a condenser 45.

A pump 46 circulates the working fluid 40 in the third circuit 38. The working fluid 40 is, for example, an organic fluid, such as butane or propane, preferably butane. The boiling point of the working fluid 40 is appreciably low and close to 80° C. for a pressure of 9.6 bar.

The boiler 42 is intended to make the working fluid 40 change from the liquid state to the gaseous state, using hot water. The first circuit 14 of the hot reservoir is in coil form inside the boiler 42, the coil being in contact with the working fluid 40. At the outlet of the boiler 42, the working fluid 40 is in the gaseous state, at a temperature of about 95° C. and under a pressure of about 11 bar.

The turbine 43 conventionally includes a rotor comprising a shaft to which vanes are fitted, and a stator comprising a housing bearing fixed deflectors. At the outlet of the turbine 43, the working fluid 40 is in the gaseous state, and at a temperature of about 40° C. under a pressure of between 2 and 3 bar. The turbine 43 is intended to convert the energy resulting from the expansion of the working fluid 40 to the gaseous state into mechanical energy. The condenser 45 is intended to make the working fluid 40 change state inside the condenser 45, said coil being in contact with the working fluid 40. At the outlet of the condenser 45, the working fluid 40 is in the liquid state.

Figure 2:
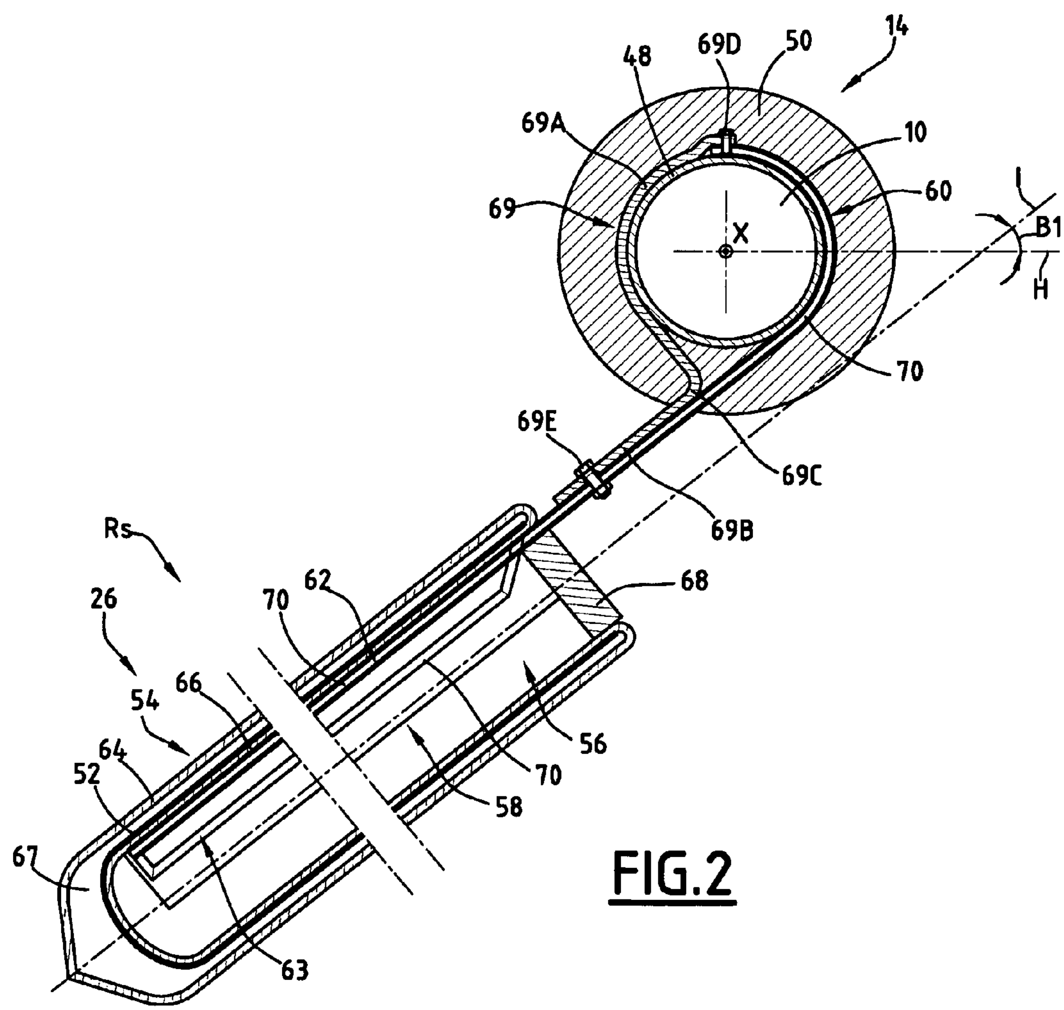
FIG. 2 is a side schematic view of a solar collector linked to a circuit for transporting a heat pipe fluid, according to a first embodiment of the invention.
Figure 3:
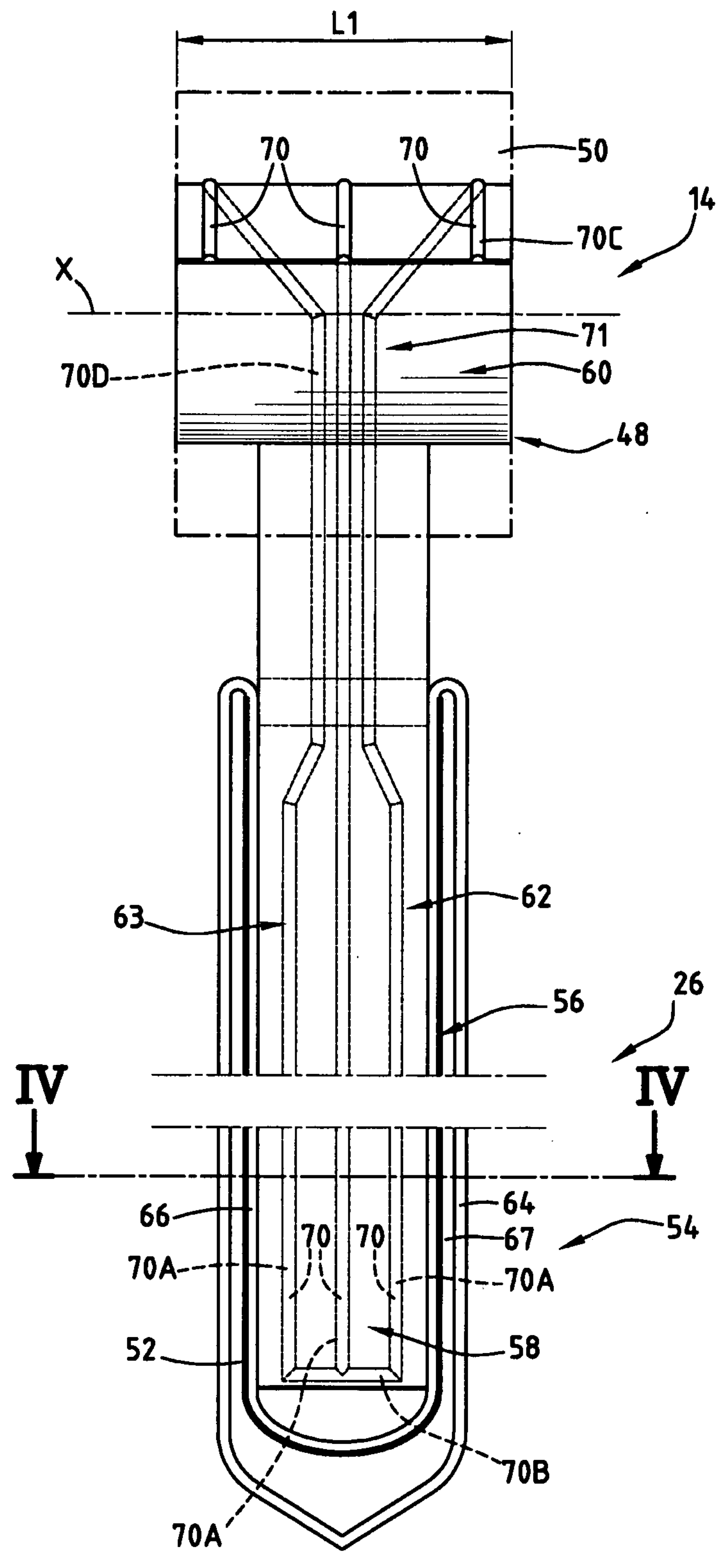
FIG. 3 is a schematic view from above of the collector and of the circuit of FIG. 2.

In FIG. 2, the first circuit 14 comprises a pipe 48 for transporting the first heat transfer fluid 10, and a thermally insulating sheath 50 arranged on the outer part of the pipe 48. The pipe 48 is in the shape of a cylinder with an axis oriented substantially on a horizontal plane H.

The solar collector 26 comprises an absorption layer 52 for absorbing solar radiation Rs, thermal insulation means 54 and a heat pipe 56. The heat pipe 56 is formed by a sheet exhibiting a warped surface closely following the shape of the insulation means 54 and of the transport pipe 48. It includes a hot part 58 laid out inside the insulation means 54, and a cold part 60 arranged outside the insulation means 54. It comprises a reservoir 62 formed by a set of channels linked one to the other by a web portion giving the heat pipe 56 its sheet structure. The reservoir 62 contains a heat pipe heat transfer fluid 63, and extends over the hot part 58 and the cold part 60. For the hot part 58 of the heat pipe, the reservoir 62 is applied at least locally against the absorption layer 52.

The absorption layer 52 is, for example, produced from pulverized aluminum nitrite.

The insulation means 54 surround the absorption layer 52 in a substantially hermetic manner and are suitable for letting the solar radiation Rs through. The insulation means 54 are suitable for thermally insulating the absorption layer 52 and the hot part 58 of the heat pipe against climatic conditions outside the solar collector 26.

Figure 4:
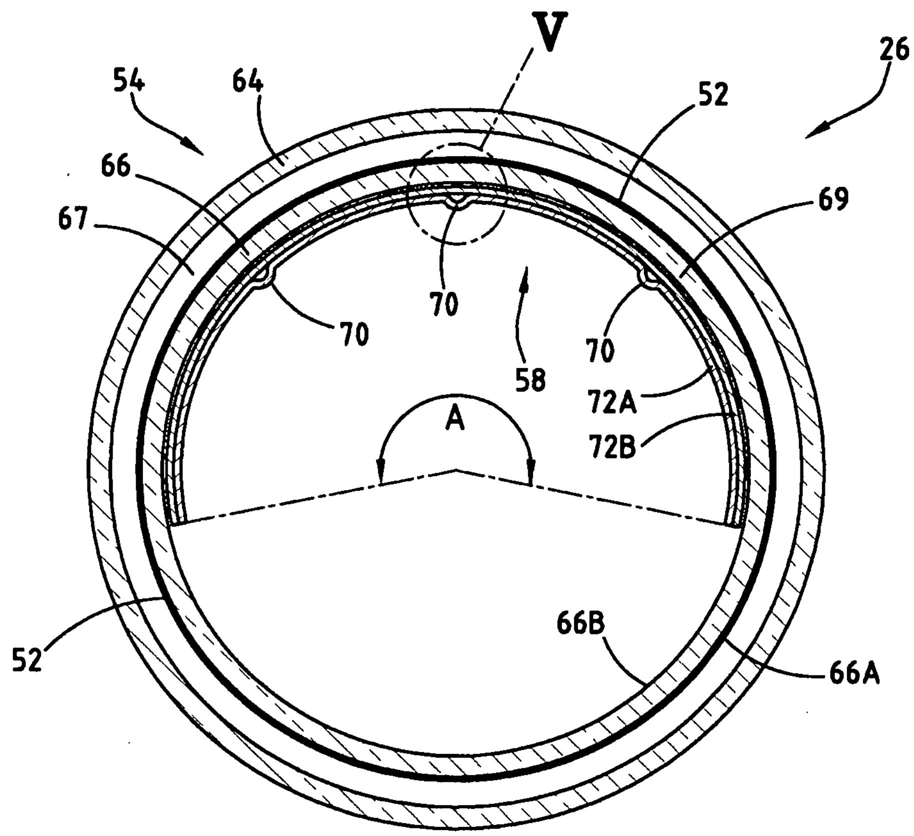
FIG. 4 is a view in cross-section on the plane IV of FIG. 3.

The insulation means 54, visible in FIG. 4, comprise an outer tube 64 and an inner tube 66 arranged inside the outer tube 64. The tubes 64, 66, substantially cylindrical, exhibit a circular cross-section and are concentric about the axis I. Each tube 64, 66 is closed in the shape of a half-sphere at one of its ends, and the tubes are sealed one to the other at the other of their ends. The inner tube 66 is open at its other end. The inner tube 66 includes an outer surface 66A oriented towards the outer tube 64, and an inner surface 66B. The two tubes 64, 66 are separated by a vacuum 67. The absorption layer 52 is arranged against the outer surface 66A of the inner tube 66, in the vacuum 67. The tubes 64, 66 are, for example, produced from glass.

The insulation means 54 include an insulation stopper 68 inserted in the open end of the inner tube 66.

Figure 5:
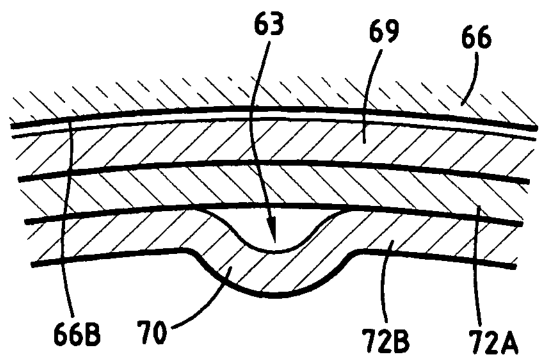
FIG. 5 is an enlargement of the framed area V in FIG. 4.

The solar collector 26 includes a thermally conductive interface 69, visible in FIGS. 4 and 5, laid out between the hot part 58 of the heat pipe and the insulation means 54. More specifically, the conductive interface 69 is arranged between the inner surface of the inner tube 66 and the hot part 58 of the heat pipe.

As a variant, the insulation means 54 comprise only the outer tube 64 closed at one of its ends, the absorption layer 52 being arranged directly on the hot part 58 of the heat pipe, a vacuum 67 being formed inside said outer tube 64.

The hot part 58 of the heat pipe is in the shape of a half-cylinder of axis I, as represented in FIG. 4. The cross-section of the hot part 58 is in the shape of an arc of a circle of an angle A of between 180° and 220°.

The hot part 58 of the heat pipe, and in particular the part of the reservoir 62 contained in this hot part 58, is applied against the inner surface 66B of the inner tube 66.

As a variant, if the insulation means 54 comprise only the outer tube 64, the hot part 58 of the heat pipe, and in particular the part of the reservoir 62 contained in this hot part, directly bears the absorption layer 52.

The cold part 60 of the heat pipe is in the shape of a half-cylinder of axis X laid out between the pipe 48 and the insulating sheath 50 while being wrapped around the pipe 48, as represented in FIG. 2.

The axis I of the half-cylinder of the hot part 58 is different from the axis X of the half-cylinder of the cold part 60.

The axis I is inclined with respect to the horizontal plane H, and forms a first angle of inclination B1 with the horizontal plane H. The value of the first angle of inclination B1 is greater than 5°, preferably greater than 30°.

Each solar collector 26 is fixed to the pipe 48 via a fastening part 69. In the example embodiment of FIG. 2, the fastening part 69 includes a cylindrical-shaped first portion 69A and a flat second portion 69B, the first and second portions 69A, 69B being linked by an elbow 69C. The fastening part 69 is thermally conductive, and is, for example, produced from aluminum. The first portion 69A is laid out in contact with the pipe 48, between the pipe 48 and the thermally insulating sheath 50, in a manner that is diametrically opposite the hot part 60 of the heat pipe with respect to the pipe 48. The second portion 69B is arranged in contact with the heat pipe 56. The fastening part 69 is attached to the heat pipe 56 via first fastening means 69D and second fastening means 69E extending through respective holes of the fastening part 69 and of the heat pipe 56.

The reservoir 62 includes, for example, three circulation channels 70 for the heat pipe fluid 63. The three circulation channels 70 are linked and form with their extensions in the cold part 60 a closed circuit for the heat pipe fluid 63. Each of the channels 70 is oriented substantially in line with the axis I of the hot part 58 in the shape of a half-cylinder. The term “substantially” is understood to mean an angular tolerance of up to ±5° with respect to the axis I.

The channels 70 exhibit parallel rectilinear sections 70A extending in the hot part 58. They are linked at their free end by a connecting pipe 70B. Each rectilinear section is extended by a rectilinear section 70C suitable for extending in the cold part 60. The sections 70A and 70C are linked by a group of convergent 70D then divergent sections arranged in the region of change of curvature of the sheet forming the heat pipe.

The heat pipe fluid 63 is, for example, methanol, ethanol, an HFC refrigerant or an HCFC refrigerant.

The heat pipe 56 includes a narrowing 71 of its circumferential extent between the hot part 58 and the cold part 60, with respect to its extent in the regular part of the hot 58 and cold 60 parts. The narrowing 71, visible in FIGS. 3 and 6, forms a connecting joint between the hot part 58 and the cold part 60.

The heat pipe 56 is formed by two sheets 72A, 72B, visible in FIGS. 4 and 5, and fixed to one another. Each channel 70 of the reservoir 62 is formed by an interstice between the two sheets 72A, 72B. The sheets 72A, 72B of the heat pipe are, for example, metal sheets merged with each other outside the areas delimiting the channels. The metal sheets 72A, 72B are, for example, produced from aluminum.

The interstices forming the channels 70 of the heat pipe are produced by depositing on one of the two sheets 72A, 72B a special ink before the merging, in order to prevent the two metals from merging in the areas where the special ink has been deposited. The two sheets 72A, 72B are then hot-rolled in order to form only one single sheet. The channels 70 are then obtained by blowing compressed air into the areas which have been inked.

Figure 6:
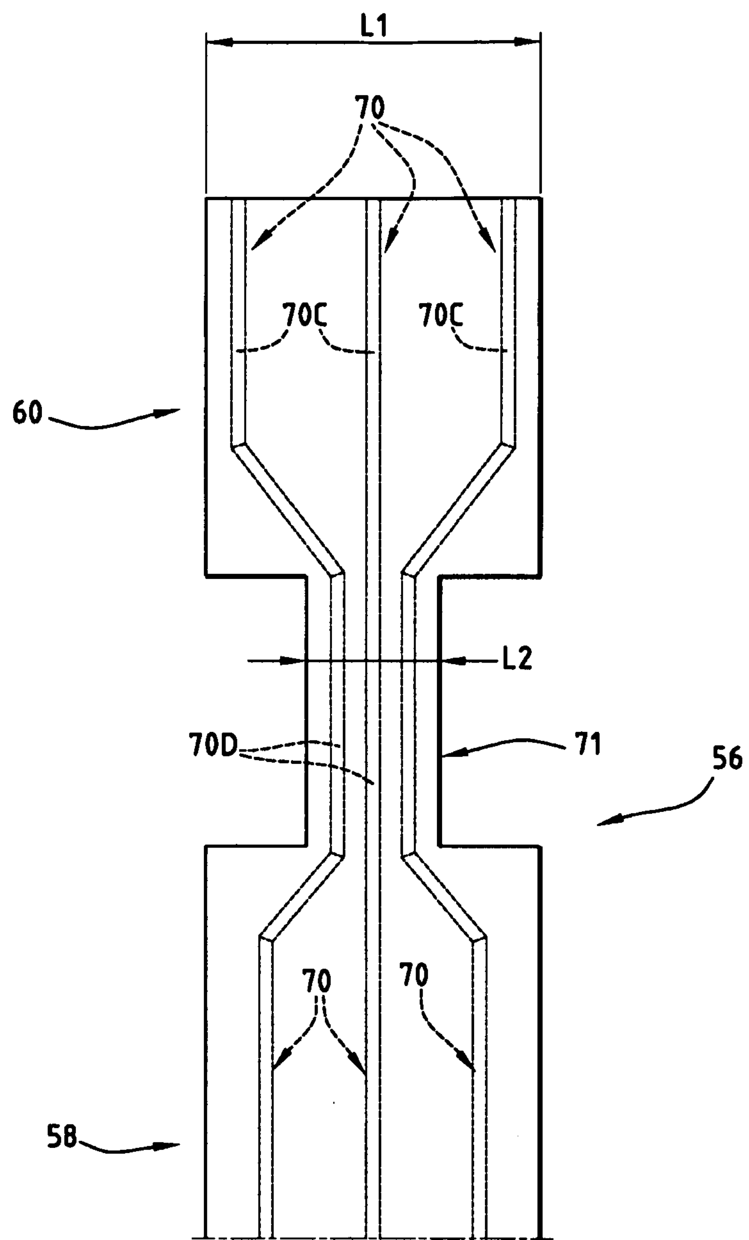
FIG. 6 is an expanded schematic view of a heat pipe of the solar collector of FIG. 3.

FIG. 6 illustrates the heat pipe 56 in its flat form after cutting the two merged sheets 72A, 72B according to the desired periphery, and before it is formed into the shapes of half-cylinders of axes I, X. The hot part 58 and the cold part 60 exhibit, for example, the same first width L1 perpendicularly to a direction of extension of the heat pipe 56. The first width L1 is, for example, equal to 80 mm. The narrowing 71 exhibits, perpendicularly to the direction of extension, a second width L2 having a value less than that of the first width L1. The second width L2 is, for example, equal to 32 mm.

The temperature of use of the vacuum-tube solar collectors 26 is between 80° C. and 150° C.

The operation of the electrical energy generation plant, and in particular of the solar collectors, will now be described.

The electrical energy generation plant is referred to as a low-temperature plant, in view of the maximum temperature of the hot water production system, equal to 150° C., which is markedly less than that used in other thermal solar power plants, such as cylindrical-parabolic collector power plants, solar tower power plants and parabolic collector power plants, where the temperature of the heat transfer fluid circulating in the hot reservoir is greater than 400° C.

The solar collectors 26 of the heating means 6 collect solar radiation Rs during the day, and then transmit the thermal energy associated with the solar radiation Rs to the first heat transfer fluid.

More specifically, the solar radiation Rs is absorbed by the absorption layer 52 of each solar collector, the insulation means 54 allowing the solar radiation Rs to pass through. The thermal energy associated with the absorption of the solar radiation Rs is then transmitted to the heat pipe 56 via the inner tube 66 and the thermally conductive interface 69. Dissipation of thermal energy outside the solar collector 26 is limited by virtue of the thermal insulation means 54, the vacuum 67 providing thermal insulation and the greenhouse effect.

Good thermal conduction is provided between the absorption layer 52, considered to be a black body, and the heat pipe 56, the reservoir 62 being applied at least locally against the inner surface 66B of the inner tube. This good thermal conduction markedly reduces the rise in temperature of the absorption layer 52 as compared with a conventional solar collector, thereby enabling heat losses by black body radiation evading the greenhouse effect to be reduced.

As a variant, if the insulation means 54 comprise only the outer tube 64, good thermal conduction is also provided between the absorption layer 52 and the heat pipe 56, the absorption layer 52 being directly applied on the hot part of 58 of the heat pipe.

The thermal energy transmitted to the hot part 58 of the heat pipe gradually brings about a change of phase of the heat pipe fluid 63, from its liquid state to its gaseous state. The heat pipe fluid in the gaseous state then rises towards the cold part 60 of the heat pipe, through the various channels 70 of the reservoir. Since the reservoir 62 is applied at least locally against the absorption layer 52 in the hot part 58 of the heat pipe, thermal conduction is improved between the absorption layer 52 and the heat pipe fluid 63, such that heat losses are reduced.

The heat transported by the heat pipe fluid 63 from the hot part 58 to the cold part 60 is then transmitted to the first heat transfer fluid 10 by thermal conduction between the channels 70 arranged in the cold part 60 and the pipe 48 of the first circuit. This thermal conduction hence brings about a rise in temperature of the first heat transfer fluid 10 and a fall in temperature of the heat pipe fluid 63.

Following the fall in temperature of the heat pipe fluid 63, the heat pipe fluid 63 gradually changes phase again, from its gaseous state to its liquid state. The heat pipe fluid in the liquid state then descends back down by gravitation from the cold part 60 to the hot part 58, by virtue of the angle of inclination B1, in order to transport again the thermal energy arising from the solar radiation.

The storage means 12 are hence used as buffers between the thermal energy produced by the solar collectors 26 of the heating means and that consumed by the electricity-producing thermodynamic machine 6. The storage means 12 therefore enable electricity production to be decoupled from solar availability.

Several operating modes can be envisaged as regards the hot water production system 2, using the valves 28, the mixer 20 and the pumps 22, 30: only storage of thermal energy, direct production of thermal energy, storage and production of thermal energy, withdrawal of thermal energy and direct production of thermal energy, and only withdrawal of thermal energy.

The feedback loop 18 is used to adapt the quantity of thermal energy supplied by the hot water production system 2 to the electricity-producing thermodynamic machine 6.

By virtue of the heat brought by the hot water production system 2, the working fluid 40 changes from the liquid state to the gaseous state in the boiler 42. The working fluid 40 thus arrives in the gaseous state at the inlet of the turbine 43. The working fluid in the gaseous state then expands in the turbine 43 and supplies mechanical energy, rotationally driving the rotor of the turbine. This mechanical energy is transmitted to the generator 44 in order to produce electricity. At the outlet of the turbine 43, the working fluid 40 is still in the gaseous state, and under a markedly lower pressure.

The working fluid 40 then changes back to the liquid state in the condenser 45 in contact with the heat sink 4. At the outlet of the condenser 45, the working fluid 40 in the liquid state is then driven by the pump 46 in order to return to the inlet of the boiler 42 and utilize once again the heat supplied by the hot water production system 2.

Figure 7:
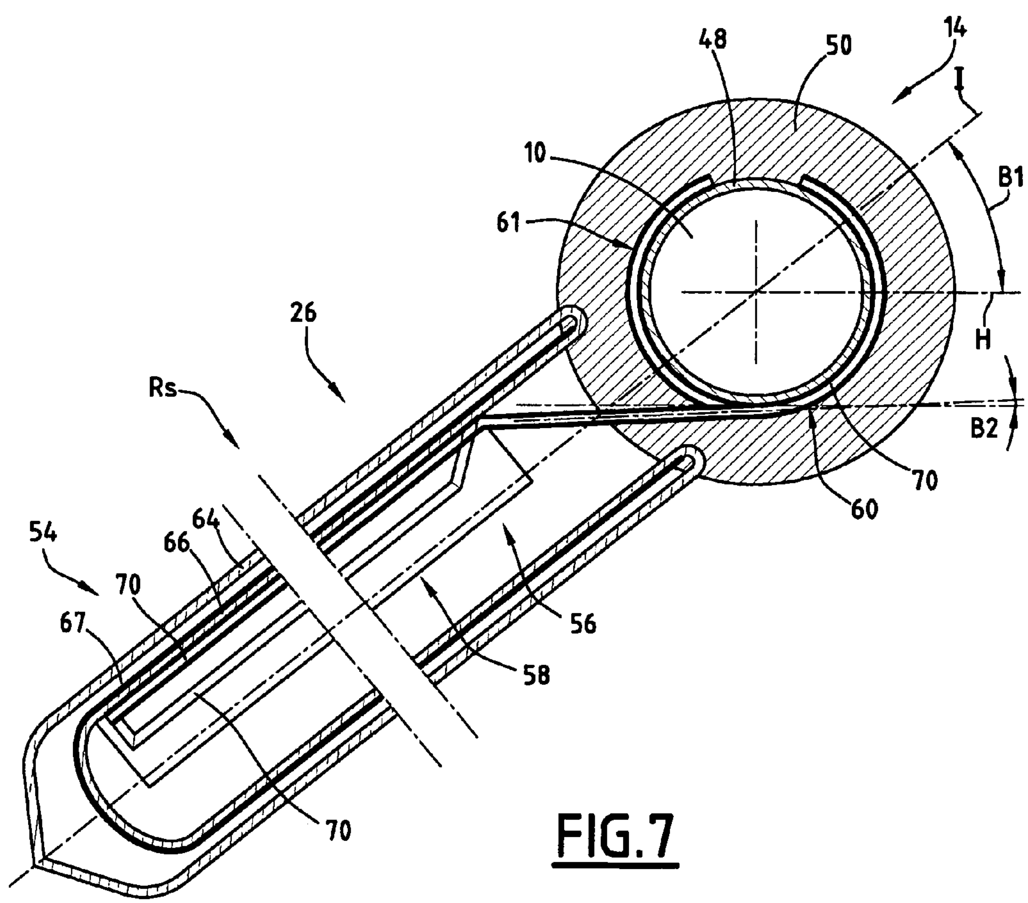
FIG. 7 is a view similar to that of FIG. 2 according to a second embodiment of the invention.

FIG. 7 illustrates another embodiment, for which items similar to the embodiment described previously are labeled using identical references.

According to this second embodiment, the insulation means 54 do not include an insulation stopper at the open end of the inner tube 66. Insulation at the open end of the inner tube 66 is provided by the insulating sheath 50 arranged around the pipe 48, the ends, sealed to each other, of the tubes 64, 66, being arranged in contact with the insulating sheath 50.

The cold part 60 of the heat pipe in the shape of two half-cylinders that are diametrically opposite with respect to the pipe 48. The half-cylinders of the cold part 60 are arranged between the pipe 48 and the insulating sheath 50.

The heat pipe 56 exhibits a second angle of inclination B2 between the top of the hot part of 58 and the bottom of the pipe 48. Varying the first angle of inclination B1 between the axis of the hot part 58 of the heat pipe and the horizontal plane H affects the second angle of inclination B2. The value of the second angle of inclination B2 is, for example, greater than 5°, in order to provide a relatively fast gravitational descent of the heat pipe fluid 63 in the liquid state from the cold part 60 to the hot part 58.

The operation of this second embodiment is identical to that of the first embodiment, and is therefore not described again.

Figure 8:
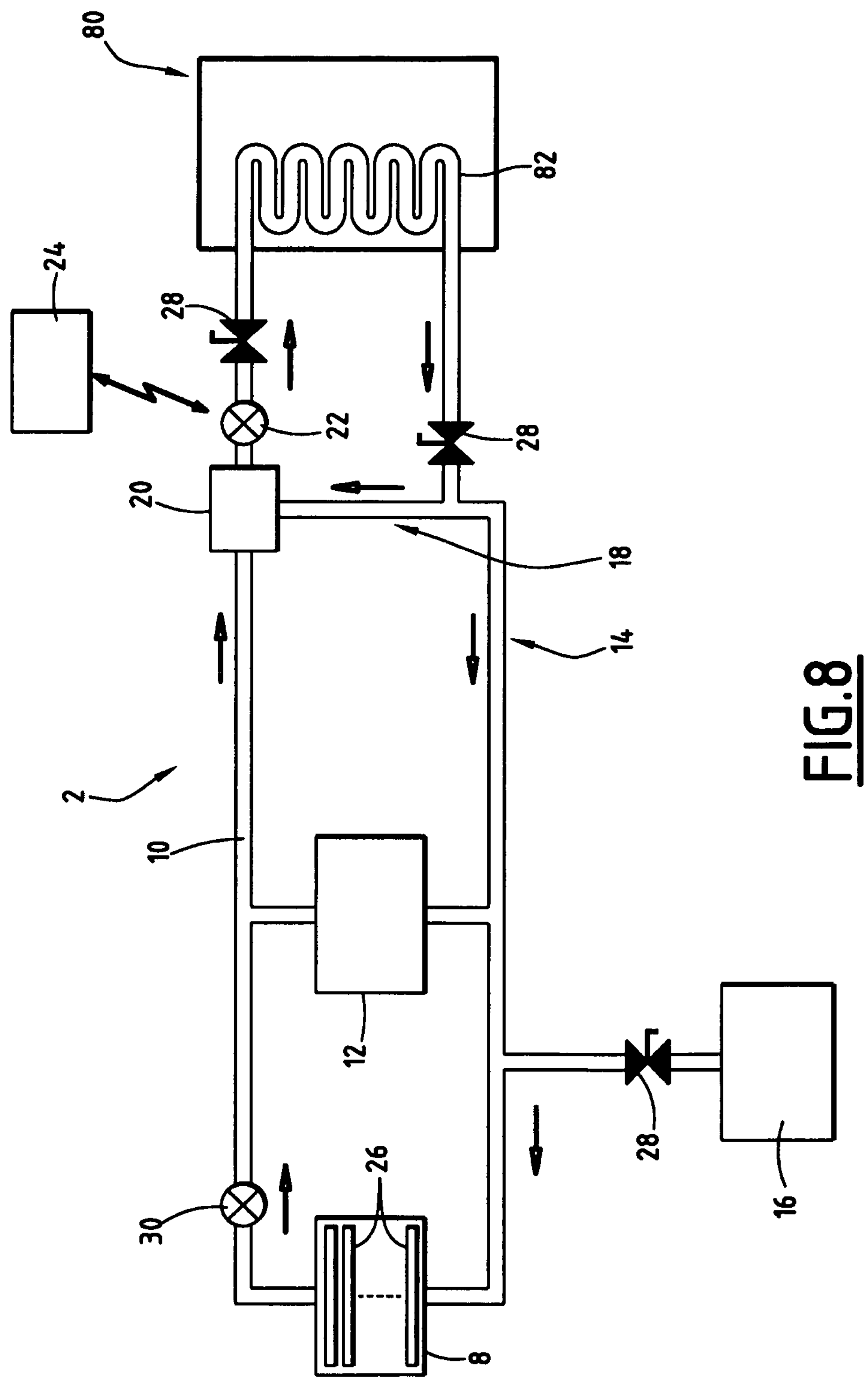
FIG. 8 is a schematic representation of a hot water production system according to the invention.

FIG. 8 illustrates another embodiment, for which items similar to the embodiment described previously are labeled using identical references.

According to this third embodiment, the hot water production system 2 comprises a hot water distributor 80, and is not linked to an electricity-producing thermodynamic machine. The circuit 14 for transporting the heat transfer fluid 10 links the solar collectors 26 to the hot water distributor 80. The distributor 80 comprises an exchanger 82, in coil form, intended to exploit the heat transported by the heat transfer fluid 10.

The operation of this third embodiment is identical to that of the first embodiment, and is therefore not described again.

It is thus understood that the solar collector according to the invention provides for better thermal conduction between the absorption layer and the reservoir in the hot part of the heat pipe, thereby having the effect of limiting heat losses.

The invention claimed is:

1. A solar collector comprising:

an outer tube of circular cross-section, closed at one of its ends;

an absorption layer arranged inside the outer tube, for absorbing solar radiation; and a heat pipe having a sheet structure with a warped surface, the heat pipe including a hot part disposed inside the outer tube, a cold part arranged outside the outer tube, and a reservoir containing a heat pipe fluid and extending over the hot part and the cold part, said outer tube being hermetically closed around the heat pipe at the other of its ends, a vacuum being formed inside said outer tube, the sheet structure including a network of channels linked by a web portion, the network of channels forming the reservoir;

wherein at the hot part of the heat pipe, at least a part of the reservoir is applied against the absorption layer, and wherein the hot part of the heat pipe is in the shape of a half-cylinder.

2. The solar collector according to claim 1, wherein the solar collector additionally comprises an inner tube of circular cross-section, arranged inside the outer tube, each tube being closed at one of its ends, and the tubes being sealed one to the other, at the other of their ends, the tubes being separated by the vacuum.

3. The solar collector according to claim 2, wherein the inner tube includes an outer surface oriented towards the outer tube, and an inner surface, in that the absorption layer is arranged against said outer surface, and in that, for the hot part of the heat pipe, the reservoir is applied against said inner surface.

4. The solar collector according to claim 1, wherein the solar collector includes a thermally conductive interface disposed between the absorption layer and the hot part of the heat pipe.

5. The solar collector according to claim 1, wherein a cross-section of the hot part is in the shape of an arc of a circle of an angle of between 180° and 220°.

6. The solar collector according to claim 1, wherein the cold part of the heat pipe is suitable for being arranged in contact with a cylindrical pipe and in that the cold part is in the shape of at least one half-cylinder.

7. The solar collector according to claim 6, wherein an axis of the half-cylinder of the hot part is different from an axis of the half-cylinder of the cold part, and in that the heat pipe includes a narrowing of its circumference between the hot part and the cold part, the narrowing forming a connecting joint between the hot part and the cold part.

8. The solar collector according to claim 6, wherein an axis of the half-cylinder of the hot part is different from an axis of the half-cylinder of the cold part, and in that the heat pipe includes a narrowing of its width in a longitudinal direction between the hot part and the cold part, the narrowing forming a connecting joint between the hot part and the cold part.

9. The solar collector according to claim 1, wherein the reservoir includes at least three channels for circulating the heat pipe fluid, generally extending side by side.

10. The solar collector according to claim 9, wherein the at least three channels are oriented substantially in line with the half-cylinder of the hot part.

11. The solar collector according to claim 10, wherein the at least three channels are longitudinally aligned with the hot part.

12. The solar collector according to claim 1, wherein the heat pipe is produced from aluminum.

13. The solar collector according to claim 1, wherein the heat pipe is formed by two metal sheets merged with each other outside an area forming the reservoir, the reservoir being formed by an interstice between the two sheets.

14. A system for producing hot water from solar energy comprising:

a plurality of solar collectors according to claim 1, the plurality of solar collectors being suitable for heating a heat transfer fluid from solar energy, and a transport circuit for transporting the heat transfer fluid between the solar collectors and a hot water distributor.

15. The system according to claim 14, wherein the transport circuit comprises a transport pipe for the heat transfer fluid, and in that the system comprises, for each solar collector, a fastening part for fastening the collector to the pipe, said fastening part being thermally conductive and arranged in contact with the pipe.

16. A plant for generating electrical energy from solar energy comprising:

a system for producing hot water according to claim 14, a heat sink, and an electricity-producing thermodynamic machine, using the hot water produced by said system and the heat sink.

* * * * *